(12) United States Patent
Moore

(10) Patent No.: US 10,885,094 B2
(45) Date of Patent: Jan. 5, 2021

(54) METHOD FOR CUEING THE DISPLAY OF ACTIVE CONTENT TO AN AUDIENCE

(71) Applicant: Peter Nicholas Moore, Chicago, IL (US)

(72) Inventor: Peter Nicholas Moore, Chicago, IL (US)

(73) Assignee: Legistek Corporation, Chicago, IL (US)

( * ) Notice: Subject to any disclaimer, the term of this patent is extended or adjusted under 35 U.S.C. 154(b) by 0 days.

(21) Appl. No.: 16/130,683

(22) Filed: Sep. 13, 2018

(65) Prior Publication Data

US 2020/0089777 A1 Mar. 19, 2020

(51) Int. Cl.
*G06F 17/30* (2006.01)
*G06F 16/435* (2019.01)
*G06F 16/44* (2019.01)
*G06F 16/438* (2019.01)

(52) U.S. Cl.
CPC ........ *G06F 16/437* (2019.01); *G06F 16/4393* (2019.01); *G06F 16/44* (2019.01)

(58) Field of Classification Search
CPC ..... G06F 16/437; G06F 16/4393; G06F 16/44
See application file for complete search history.

(56) References Cited

U.S. PATENT DOCUMENTS

| | | | | |
|---|---|---|---|---|
| 4,806,919 A * | 2/1989 | Nakayama | ............ | G06F 3/0481 345/545 |
| 5,473,744 A * | 12/1995 | Allen | ..................... | G09B 5/065 715/273 |
| 6,041,335 A * | 3/2000 | Merritt | .................. | G06F 40/106 715/203 |
| 6,584,479 B2 * | 6/2003 | Chang | .................. | G06F 40/103 715/205 |
| 6,675,352 B1 * | 1/2004 | Osaki | ...................... | G06T 11/60 715/203 |
| 7,418,656 B1 * | 8/2008 | Petersen | ............... | G06F 40/169 715/230 |
| 9,141,332 B2 * | 9/2015 | Coleman | ................. | G06F 21/55 |
| 9,383,887 B1 * | 7/2016 | Khafizov | .............. | G06F 3/0481 |
| 9,407,942 B2 * | 8/2016 | Brenneman | ........ | H04N 21/2353 |
| 9,977,785 B2 * | 5/2018 | Moore | ................ | G06F 16/4393 |
| 2002/0010707 A1 * | 1/2002 | Chang | .................. | G06F 40/169 715/205 |
| 2005/0151750 A1 * | 7/2005 | Marion | .................... | G09G 5/14 345/581 |
| 2006/0061595 A1 * | 3/2006 | Goede | .................. | G06F 40/169 345/619 |
| 2007/0162907 A1 * | 7/2007 | Herlocker | .............. | G06Q 10/10 718/100 |
| 2010/0293190 A1 * | 11/2010 | Kaiser | ................ | H04N 21/4312 707/769 |

(Continued)

*Primary Examiner* — Jung-Mu T Chuang

(57) ABSTRACT

A content presentation system is disclosed for composing a visual scene for an audience using content contained in a storage device, and storing the visual appearance of the scene for later retrieval and recreation by the presentation system. Scenes are recalled in a manner that permits further manipulation of the scene during the live presentation. Scenes can furthermore be recalled in random order, or cued to time-based media such as video, modifying existing elements in the staging area to the extent necessary to recreate the stored scene.

9 Claims, 12 Drawing Sheets

(56) References Cited

U.S. PATENT DOCUMENTS

| | | | | |
|---|---|---|---|---|
| 2013/0067333 A1* | 3/2013 | Brenneman | H04N 21/278 | |
| | | | | 715/721 |
| 2013/0262988 A1* | 10/2013 | Nakagawa | G06F 40/103 | |
| | | | | 715/243 |
| 2013/0334300 A1* | 12/2013 | Evans | G06Q 10/06 | |
| | | | | 235/375 |
| 2014/0089799 A1* | 3/2014 | Evans | H04N 9/8233 | |
| | | | | 715/716 |
| 2014/0118793 A1* | 5/2014 | Wyatt | H04N 1/32229 | |
| | | | | 358/3.28 |
| 2014/0359452 A1* | 12/2014 | Roach | G06F 3/04897 | |
| | | | | 715/730 |
| 2015/0220504 A1* | 8/2015 | Bocanegra Alvarez | | |
| | | | G06F 40/169 | |
| | | | | 715/233 |
| 2018/0020243 A1* | 1/2018 | Ni | H04N 21/23418 | |

* cited by examiner

FIG. 7

METHOD FOR CUEING THE DISPLAY OF ACTIVE CONTENT TO AN AUDIENCE

CROSS-REFERENCE TO RELATED APPLICATIONS

This application claims the benefit of provisional patent application No. 61/988,590, filed May 5, 2014, and is a continuation of nonprovisional U.S. patent application Ser. No. 14/704,206, filed May 5, 2015.

BACKGROUND OF THE INVENTION

Presenting documents and other displayable content to an audience in a compelling way has become an important part of public speaking. Presentation software, such as MICROSOFT POWERPOINT is now often an essential part of addressing groups of people in business or official contexts. An advantage of slide-based presentation software is that a presenter can advance the slideshow simply, even remotely, without detracting from the presentation by having to concentrate on operating a computer. Such presentation software is limited, however, in its relative inability to manipulate the content that is displayed during a presentation. In other words that content is generally not "live" during presentations.

For presentations where more flexibility is needed, such as courtroom trials, specialized presentation software is available, such as INDATA TRIAL DIRECTOR. This software allows manipulation or annotation of the displayed content in real time during the presentation. For example, an operator can pull up a different document, move to an arbitrary page of a document, move a document around on the screen, zoom in or out of a section of a document, callout a portion, highlight a portion, circle a portion, and the like, all in real time.

A drawback of certain prior art applications in this field is that they are not conducive to operation by the speaker or presenter, however. Usually presenters, such as questioning attorneys, require another person sitting behind the scenes (sometimes called a "hot seat" operator) to operate the software in response to verbal cues. While it is possible for the presenter to use the software on a laptop at a podium, the software is designed for use with a mouse and keyboard, which can be awkward and distracting to try to use during a live presentation. Further, these prior art applications makes inefficient use of screen real estate on the assumption that a live operator is set up behind a desk with a generously sized computer screen. Moreover, annotation and manipulation tools of other presentation applications can be complex and difficult to learn and use, particularly for an attorney in a courtroom whose focus needs to be on the trial or hearing.

Recently, software has become available to try to provide some of the functionality of specialized courtroom presentation applications on a tablet PC, intended to be used by the presenter rather than with the assistance of a separate operator. These apps replace mouse and keyboard interaction with allowing manipulation of the displayable content in response to multitouch gestures by the operator; for example, "pinch to zoom." However, these apps still rely heavily on user interaction in real time.

BRIEF SUMMARY OF THE INVENTION

A goal of the present invention, therefore, is to provide a presentation system that minimizes the need for user interaction during a live presentation, like a slideshow, yet still allows displayed content to remain "live", i.e., dynamic and capable of manipulation depending on the needs of the user and the presentation. To this end, the invention claimed herein is a cueing system for allowing a user to create complex scenes of annotated documents and videos and store those scenes for later recall, like slides, but to have those scenes, once recalled, remain live and capable of manipulation in real time as though they had been created initially at that time. Furthermore, the invention permits cued scenes not only to be recalled on command, but also to be synchronized to a time-based medium (such as a video or transcript) and recalled automatically during playback, again with minimal user interaction during the presentation. These and other aspects of the present invention will be described in detail herein.

BRIEF DESCRIPTION OF THE SEVERAL VIEWS OF THE DRAWINGS

Hereinafter the present invention will be explained by way of example with reference to the attached drawings. Therein are shown:

FIG. 7 depicts a presenter's view of the presentation of video in a preferred embodiment, including a user interface for cueing the appearance of documents and annotations in sequence with the video.

DETAILED DESCRIPTION OF THE INVENTION

The invention is intended to work as part of an interactive document and evidence presentation user interface, such as the one described in U.S. Pat. No. 9,977,785, Method and computer readable medium for presenting displayable content to an audience (Moore), the disclosure of which is hereby incorporated by reference, or systems similar to the aforementioned prior art.

Figure 1:
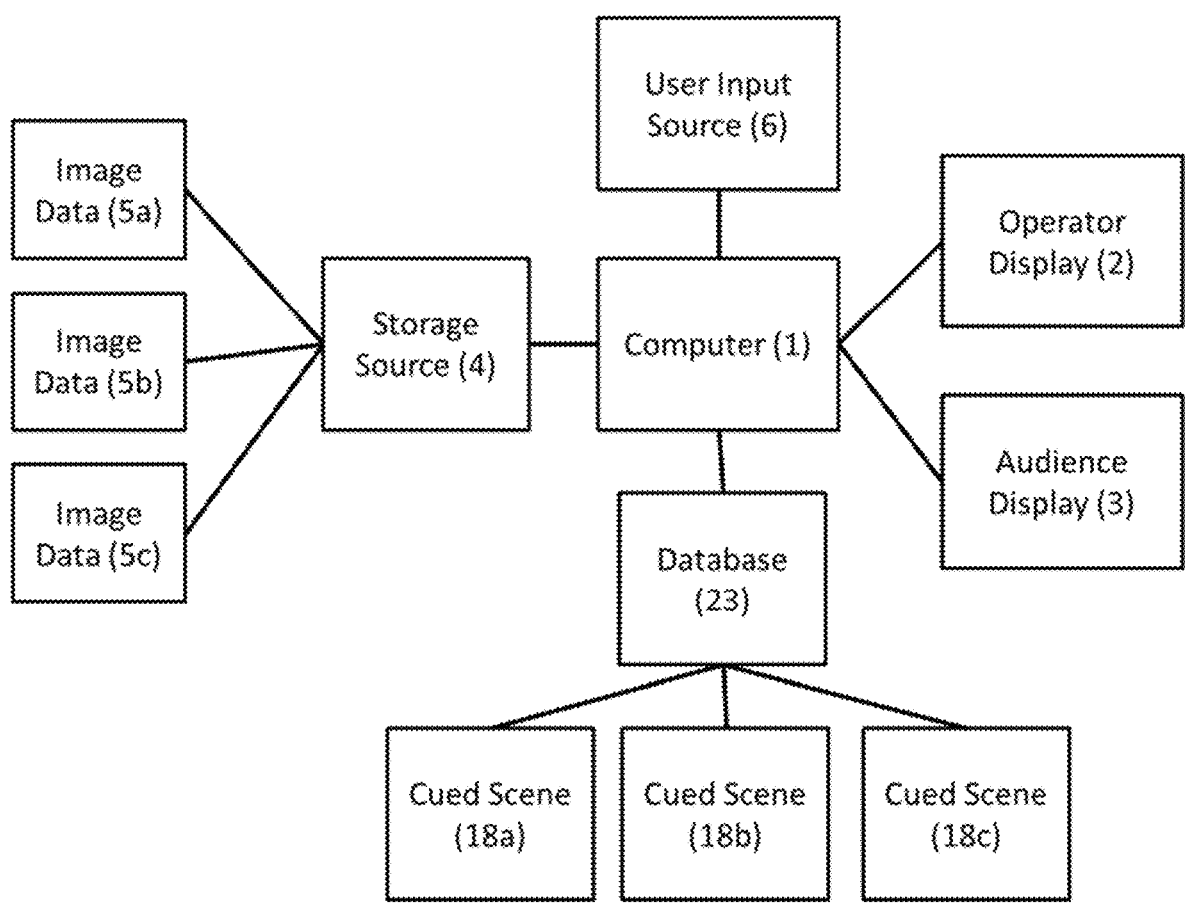
FIG. 1 represents the components of a preferred embodiment of the invention.

In a first preferred embodiment, referring first to FIG. 1, a software program is running on a computer (1) connected to, or integral with, an operator display (2) (such as a laptop or tablet PC). The computer (1) is also capable of being connected to a second, audience display (3) during presentations; however, the computer (1) need not be connected to the second display (3) when not actively presenting content, such as while designing a presentation.

To prepare for a future presentation, an operator of the program uses a user input source (6) connected to the computer (1) to select one or more sets of image data (5a, 5b, 5c, . . . ) from a storage source (4). The image data (5) can represent scanned documents, photographs, movies, or any other multimedia data that the user might wish to display to an audience during his presentation. In a preferred embodiment, the image data (5) represent evidence to be displayed to a jury or judge during a trial or hearing. Preferably, the image data (5) are in a bitmap format, such as a tagged image file format ("TIFF"), or in the case of video, in an MPEG format such as MP4. The storage source (4) may be integrated with the computer, or may be any other kind of available data storage source such as an external device, or cloud storage.

In a typical embodiment, the image data sets (5) are depicted to the operator by thumbnail images on the operator display (2) that are not visible on the audience display (3) (as described in the Moore patent). The input source (6) can constitute a keyboard and mouse, or preferably a multitouch display such as that present on a tablet, or any other human-computer interface device. Thus, when the program is running on a tablet PC, a typical operation would be for the user to tap on a thumbnail representing the image data (5) in order to bring it up on the display (2).

Figure 2:
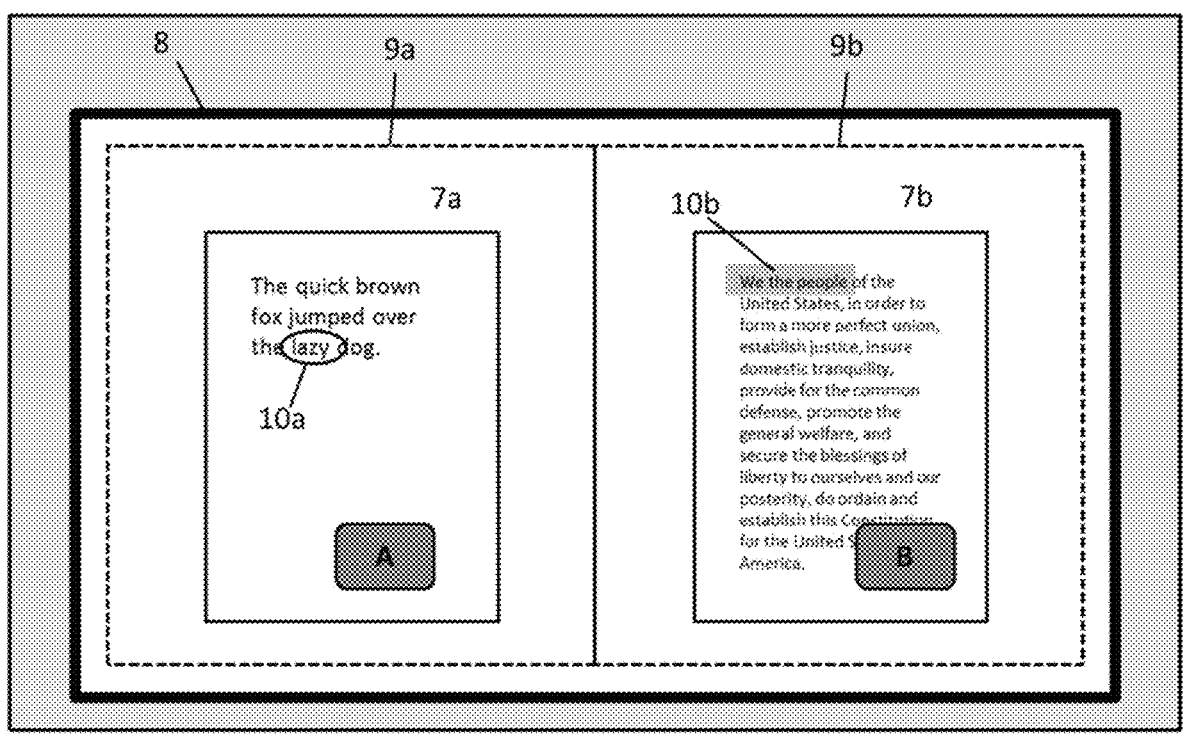
FIG. 2 depicts a user interface in a preferred embodiment, displaying two documents side-by-side with user-added annotations.

Referring now to FIG. 2, once image data (5) has been selected, the program creates displayable copies of the images (7a, 7b, . . . ) and displays the image copies (7) in individual image windows (9a, 9b, . . . ) that are "child windows" of a staging area (8) on the operator's display (2). The image windows (9) are in the preferred embodiment MICROSOFT WINDOWS "UserControl" s, the borders of which are ordinarily not visible (and thus the image window boundaries are represented with dashed lines in FIG. 2). The staging area (8) represents content that may optionally be projected to the audience display (3), and is also a User-Control in the preferred embodiment.

The program is capable of manipulating the image copies (7) in response to user interaction through the input source (6). There are at least three categories of manipulations allowed in the preferred embodiment. The first type (pan/zoom/dock) alters the position and magnification of the image copy (7) within the image window (9) or the staging area (8). In a preferred embodiment, each image window (9) can be docked either to the left or right side of the staging area (8), or can fill the entire staging area (8) (obscuring or closing any other image windows). Each image copy (7) can also be panned or magnified within the image window (9) itself. In the preferred embodiment, an image copy (7) is magnified using a pinch to zoom multitouch gesture performed on the input source (6). In this embodiment the image copy (7) cannot expand beyond the bounds of the image window (9), and thus if it is magnified beyond those bounds the image window (9) will clip any portions outside of its bounds. An image copy (7) is panned (moved) in the preferred embodiment in the X or Y directions, using a multitouch slide gesture through input source (6), and likewise portions of the image copy (7) that would fall outside the bounds of the image window (9) are clipped.

A second kind of manipulation permitted in the preferred embodiment alters the appearance of an image copy (7) by superimposing graphical annotations (10) on top of it. Referring still to FIG. 2, both image copies (7a, 7b) have been annotated, the first (7a) with a red circle (10a), the second (7b) with a yellow semitransparent highlight (10b). These annotations (10) are not created by altering the underlying image data (5), nor by altering the data bits constituting the image copy (7), but, rather, in the preferred embodiment are additional visual elements added to the image windows (9). For instance, in FIG. 2, the annotations (10) are created with Ellipse and Rectangle controls, respectively, in MICROSOFT WINDOWS, which become client or child windows of the image windows (9). More specifically, in the preferred embodiment, an image window contains as a child a "Canvas" control whose direct children include the image copy (7) and the annotations (10). Of course, persons of skill in the art of graphical user interface programming will appreciate that a multitude of programmatic means exist for representing images within windows and graphical annotations thereof, and the particular implementation described herein is not intended to be limiting.

Figure 3:
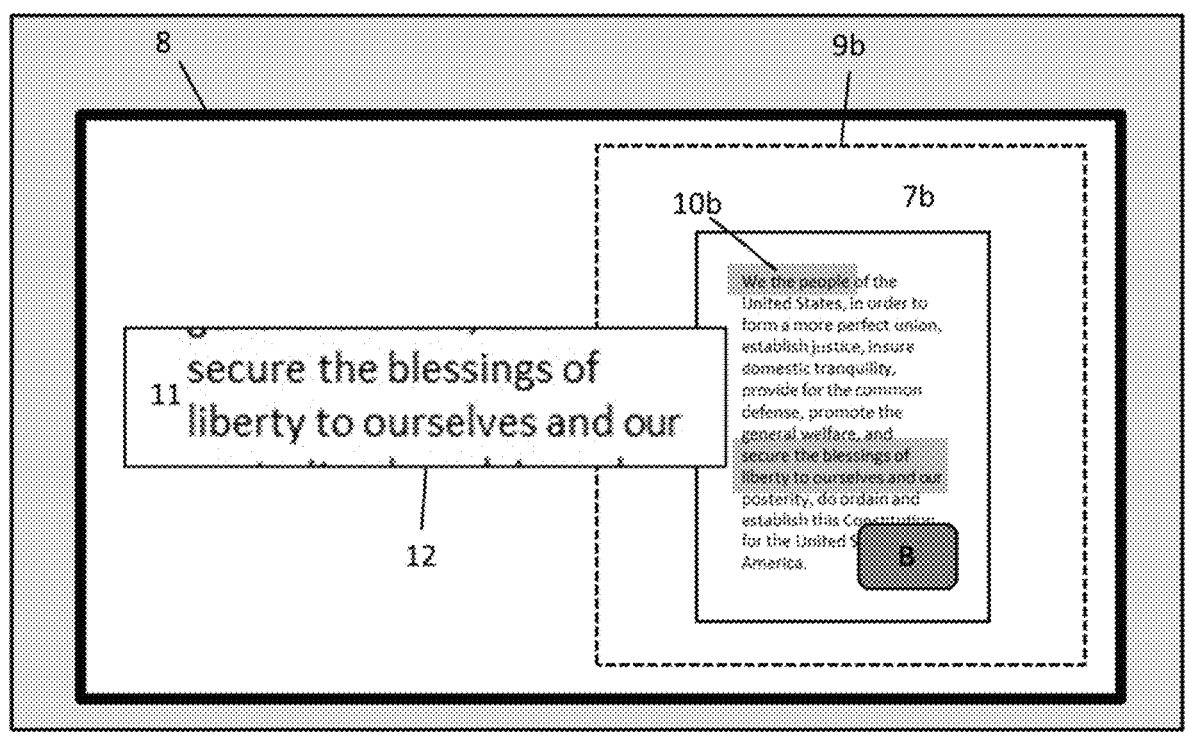
FIG. 3 depicts a user interface in a preferred embodiment, displaying a document alongside a callout window displaying a magnified portion of the document.

A third kind of manipulation allowed in the preferred embodiment is a callout (11) of a portion of an image (5). Referring to FIG. 3, the image copy (7a) that had been on the left side of the staging area (8) in FIG. 2 has been removed, as has image window (9a). In their place, a callout image window (12) displays a callout (11) created from a subset of image data (5b). The callout (11) is initially created when the operator highlights a rectangular portion of image copy (7b) using the input source (6). Once created, the callout window (12) can then be moved around in the staging area (8) or magnified through user input. Again, in the preferred embodiment, these operations are performed with multitouch gestures—pinch to zoom is used to magnify the callout window (12), and single-finger sliding motions are used to move the window (12) within the staging area (8).

Figure 4:
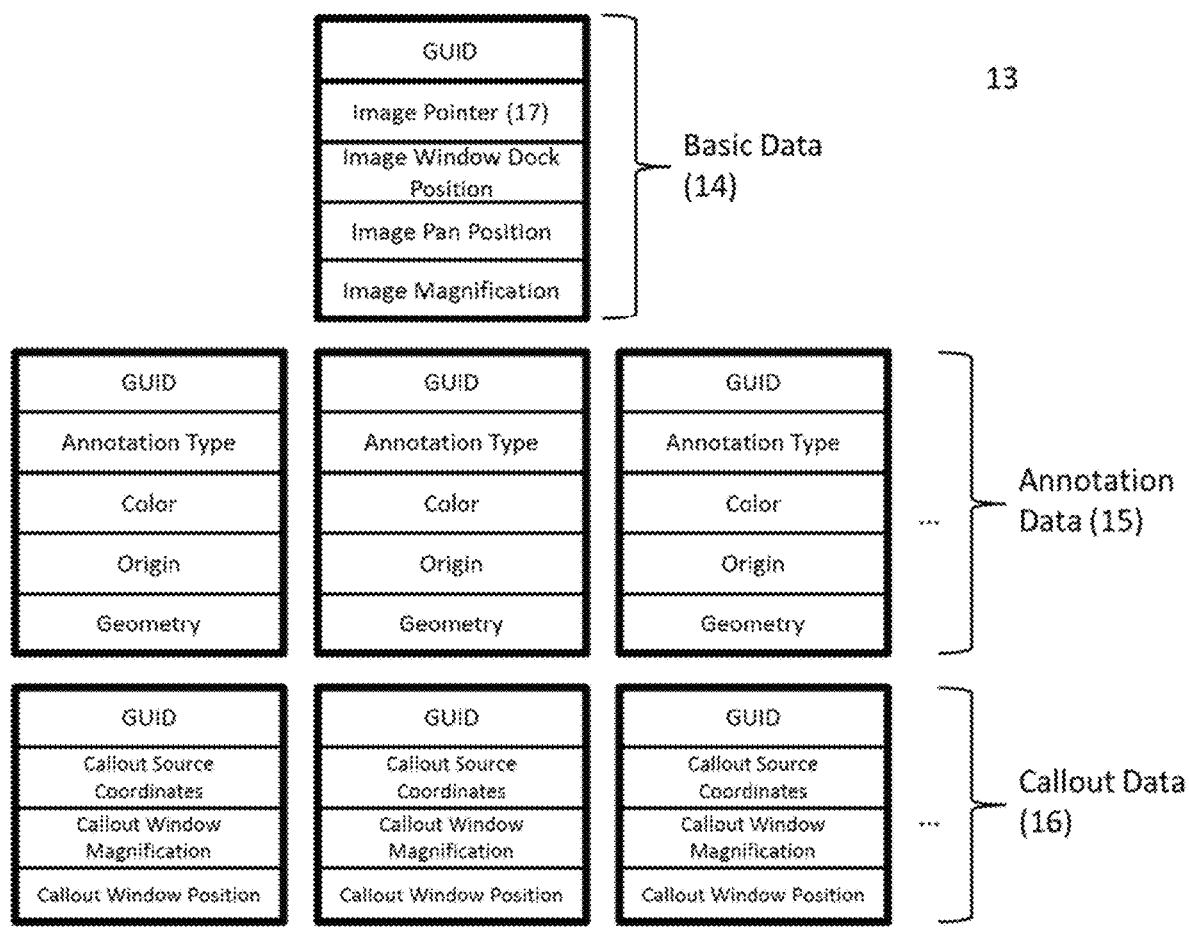
FIG. 4 represents data structures for storing information about image windows and annotations in a preferred embodiment.

Turning to FIG. 4, in the preferred embodiment, information about an image window (9), including manipulations that have been performed on its image copy (7), is tracked internally in a data structure (13) associated with each window (9) active in the staging area (8) at any given time. The data structure contains one or more substructures (14, 15, 16), each representing the different kinds of data being recorded.

The basic data substructure (14) includes basic information about the image window (9) and its image copy (7). This includes a pointer (17) to the image data (5) used to generate the image copy (7) being displayed in the image window (9). The pointer (17) can be of any form, direct or indirect; in the preferred embodiment, the pointer (17) is a GUID, or globally unique identifier, which as is understood in the art of computer science is a quasi-unique quasi-random number which is, for all relevant purposes, guaranteed to be globally unique throughout the program's usable lifetime. The GUID in this embodiment identifies the image data (5) in the storage source (4), and is assigned to the image window (9) at the time it is opened with the image copy (7). Next, the basic data (14) includes the location of the staging area (8) at which the image window (9) is docked, i.e., left, right, or full screen. The remaining two items in the basic data (14) used in the preferred embodiment describes pan and zoom manipulations applied to the image copy (7). The data includes the relative x/y position of the image copy (7)

within the image window (9), and the relative magnification factor of the image copy (7). The manner in which these and other parameters are calculated and interpreted is described in more detail below.

The next substructures included in the data structure (13) in the preferred embodiment are annotation substructures (15), which comprise annotation data for each visual annotation (10) performed on the image copy (7). Each annotation substructure (15) represents a single annotation (10). Each annotation substructure (15) preferably contains a GUID generated at the time the annotation is made. The remaining items in the annotation substructure include data describing the type of annotation (e.g., highlight, box, line, ellipse, etc.), its color, its position relative to the upper left corner of the image copy (7), and data describing its geometry. In the case of a highlight, for example, the geometry data includes the length and width of the rectangle relative to the origin of the image copy (7).

A third set of substructures, callout data substructures (16), comprise callout data for each callout window (12) associated with an image window (9). Again, a GUID is preferably recorded, created at the time the callout window (12) is created by the operator. Another piece of data includes the x/y coordinates identifying the rectangular subset of the image data (5) being represented by the callout (11) in the callout window (12). Next, the magnification of the callout window (12), and the position of the callout window (12) relative to the staging area (8) are recorded. In the preferred embodiment, a callout window (12) is associated with, but not a child of, the image window (9); rather, the callout window (12) is a child of the staging area (8). In this fashion, the callout window (12) can be moved anywhere in the staging area (8), including outside the bounds of the image window (9), unlike an image copy (7). Optionally, the callout data substructure (16) might itself include sets of annotation data (15) representing annotations (10) to the callout itself. In other words, the callout (11) and the image copy (7) need not contain the same annotations. Optionally, the program can be configured to mirror annotations (10) performed on the callout (11) onto the associated image copy (7), and vice versa.

Once the operator has arranged the staging area as desired, the program allows the data structures (13) for each image window to be written to a computer-readable database (23) accessible by the computer (1) as shown in FIG. 1. The database (23) may be part of the same data storage source (4) as the images (5), but need not be. In the preferred embodiment, the database (23) contains logical information about all of the visual items the operator wishes to display during the presentation, i.e., the logical items represented by the image data (5). This can include user-friendly names and descriptions, and preferably permits organization of items in a hierarchical folder structure for retrieval. In the preferred embodiment, all of the data structures (13) for the active image windows (9) can be stored as a collective data structure representing a single cued scene (18) that represents the entire staging area (8) at the time the cue is created. The cued scene (18) then becomes another entry in the database (23) for the user to later access and use to instruct the program to display in the staging area (8).

Figure 5A:
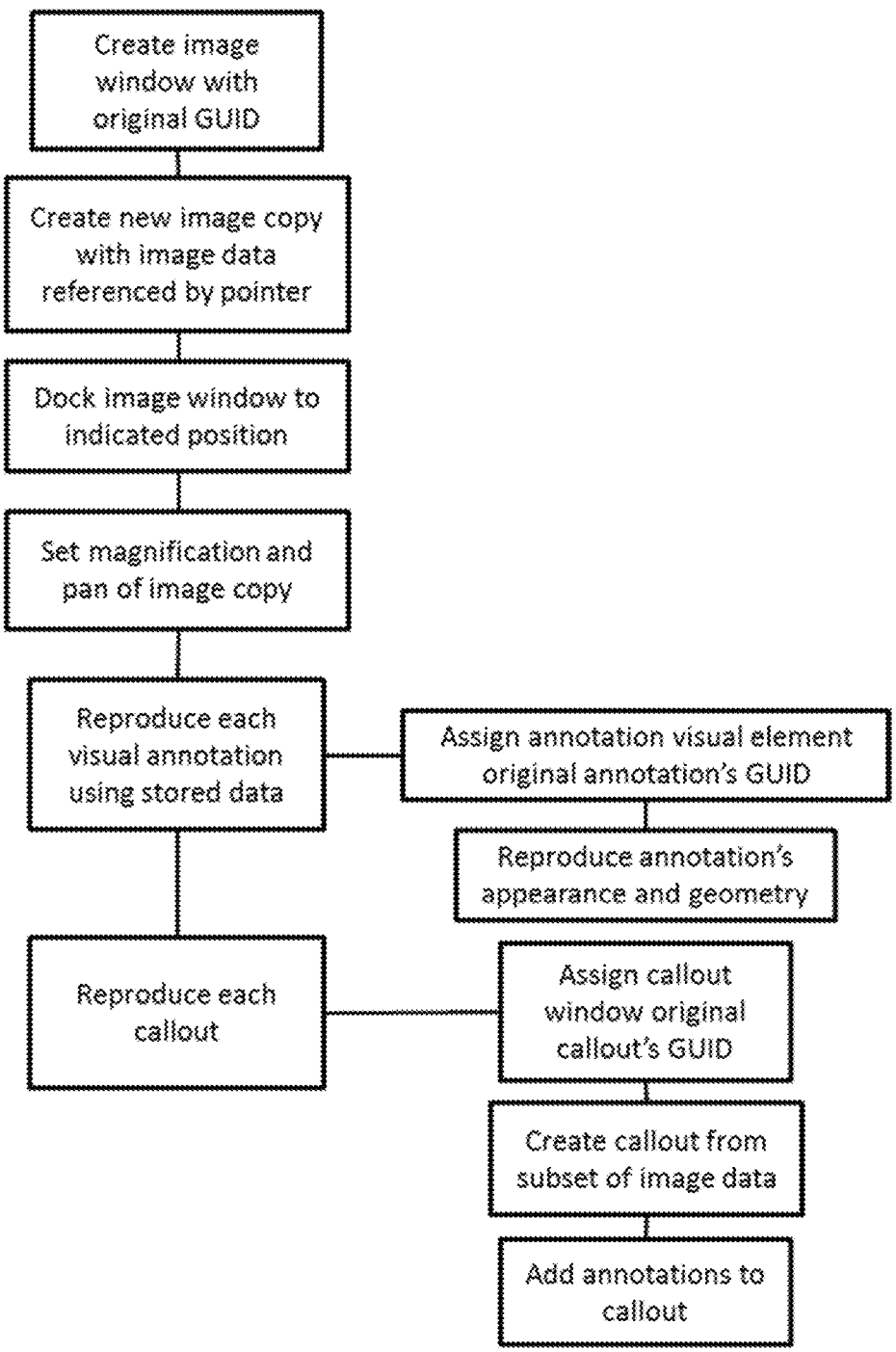
FIG. 5a depicts the steps used in a preferred embodiment for recreating the appearance of a staging area based on data for a cued scene.
Figure 5B:
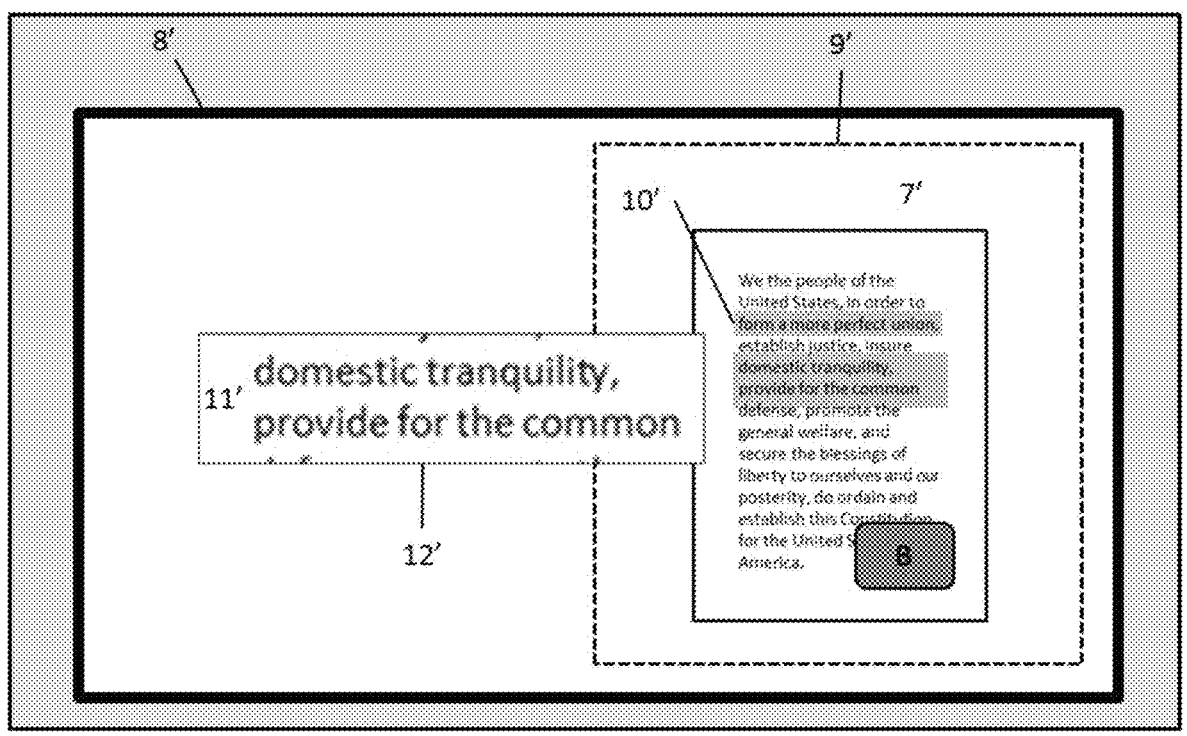
FIG. 5b depicts a user interface in a preferred embodiment, displaying a recreation of a previously stored scene, which includes a document displayed alongside a callout window displaying a magnified portion of the document.

Based on the foregoing, it will be appreciated that the cued scene (18)'s data structures (13), combined with the image data (5) in the data storage source (4), include all of the information necessary to reproduce the visual appearance of the staging area (8) at the time the cued scene (18) was saved. Reproducing the appearance of a staging area (8) from a cued scene (18) in the preferred embodiment involves performing a series of automatic steps for each data structure (13) associated with the cued scene (18). The steps for each data structure (13) are seen in FIG. 5. First an image window (9') is created as depicted in FIG. 5b, and, using the pointer (17), a new image copy (7') is created by accessing the same image data (5) used to generate the original image copy (7). The new image window (9')'s docking position in the staging area (8) is then set to that indicated in the substructure (14), i.e., left, right, or full screen. The new image copy (7')'s pan and magnification within the image window (9) are then set. Next, each annotation data substructure (15) is used to recreate the annotations (10) that had been added to the original image copy (7). Based on the indicated annotation type, color, origin, and geometry, the software adds new visual elements to the image window (9') (i.e., Rectangle control, Ellipse control, etc.) and sets their visual properties according to the data in the substructure (15). Preferably, each visual element is assigned the same GUID held by the original annotation (10) as indicated in the substructure (15). Finally, any callouts (11') to be associated with the new image windows (9') are added to the staging area (8) using data from the substructures (16), with the new callout windows (12') again being assigned the same GUIDs held by the original callout windows (12).

Notably, when the operator is using the program to present content to an audience, the process described above and depicted in FIG. 5 is applied both for the operator display (2) and for the audience display (3), as described in the Moore patent. At presentation time, when a scene (18) is recalled both the audience display (3) and the operator display (2) depict substantially the visual contents of the staging area (8) at the time the cued scene (18) was created.

A useful feature of the present invention is that, once a cued scene (18) has been recalled as described, the staging area (8) of the operator's display (2) remains interactive, and capable of further manipulation via the user input source (6), just as it was at the time the operator created the cued scene (18). Thus, the operator remains free to further manipulate the image copies (7'), or add further annotations (10'), or further callouts (11'), at will. Moreover, each step of the recall of a scene can be optionally animated to give the audience the appearance that individual visual elements are being added in real time, rather than through a pre-configured cue. For example, a callout (11'), rather than appear instantaneously when the image copy (7') is displayed, might be animated so as to originate from its logical source position in the image copy (7'), and at the same magnification, and then to magnify and move to its destination position. This emphasizes to the audience that the callout (11') is a zoomed-in view of the image copy (7').

As should be appreciated from the foregoing description, cued scenes (18) can be recalled at the operator's command during a presentation, and reproduced faithfully, without regard to what is present in the staging area (8) at the time of recall. This is because the cued scenes (18) store complete, rather than incremental, information about the scene, as contrasted to a scripting system (such as "add highlight at position x, y with dimensions w,h"). As such, the cues (18) can be executed in any desired sequence, not only in the order in which they were created. In another embodiment of the invention, because of this random access ability, and to improve efficiency and minimize disruption of existing screen elements, cued scenes (18) can be restored in an incremental, rather than absolute, fashion, depending on what visual elements necessary for the cued scene (18) are already present in the staging area (8) at the time of recall.

As is common in presentations, an operator may wish to cue a series of annotations to a document in succession, e.g., first pulling up a document image, then highlighting a portion, then calling out one portion, then removing the first callout and calling out a second portion. The operator would accomplish this with the presently described invention by storing a cued scene (18) for each distinct set of annotations he wished to present, and then recalling those cued scenes (18) later in the desired order. However, in this scenario, the main image that is the focus of the presentation does not change among the four cues. Therefore, in another embodiment of the invention, the program can, at the time a cued scene (18) is recalled, first evaluate which visual elements—based on the GUIDs contained in the data structures (13)—are already present in the visual "tree" of the staging area (8), before creating new, redundant visual elements representing the same data. If, for example, an image window (9) is already present with a GUID matching that found in the basic data substructure (14), this would indicate that the window (9) already contains an image copy (7) of the same image data (5) identified by the pointer (17). Thus, the program in this embodiment would not reload the underlying image data (5), but rather will rely on the presumption that the image copy (7) was already added by an earlier cue, or manually by the user himself. Still, the cued scene (18) might specify a pan and magnification different from what is presently displayed, in which case the program changes the visual parameters (i.e. pan and magnification) of the image copy (7) to match those required by the cued scene (18). Similarly, the program can check for GUIDs in the visual "tree" matching annotations and callouts represented in the data structure (13), likewise not redundantly reproducing visual elements already present, or altering them only to the extent necessary to match the cued scene (18). Finally, any visual elements existing on the staging area (8) that are not part of the cued scene (18) would be removed.

The distinct advantage of the invention's capability of incremental scene recall is that cued scenes can be recalled in any sequence desired by the operator at the time of presentation, yet without the inefficiency and visual awkwardness of resetting the staging area (8) before each cue, nor with the limitation that cues must be executed in sequence, such as would be the case in a pre-programmed slideshow. That is, the illusion of manipulating and annotating a single document in real time, which, as noted above, in the prior art usually requires use of a second operator responding to the presenter's verbal commands, can be presented to the audience merely by accessing and recalling cued scenes with minimal user interaction, retaining the flexibility to change the sequence of the cues and to further manipulate the displayed images as needed during the presentation.

Besides permitting the recall of cued scenes (18) at the operator's specific command, the invention also permits cued scenes (18) to be linked to time-based media such as videos, with a cued scene (18) being automatically recalled when a particular location is reached during the playback of the media. One embodiment of this aspect of the invention is depicted initially in FIG. 6, which in this particular case is a view of the audience display (3) showing only the staging area (8) and no user interface elements or operator-specific content (as discussed in the Moore patent). In this figure, there is one image window (9*a*) in the staging area (8), which contains an image copy (7*a*) constituting a video of a witness giving a deposition. Also depicted is an optional transcript window (19) displaying the text of the deposition transcript, which has been synchronized with the video media as is known in the art.

Figure 7:
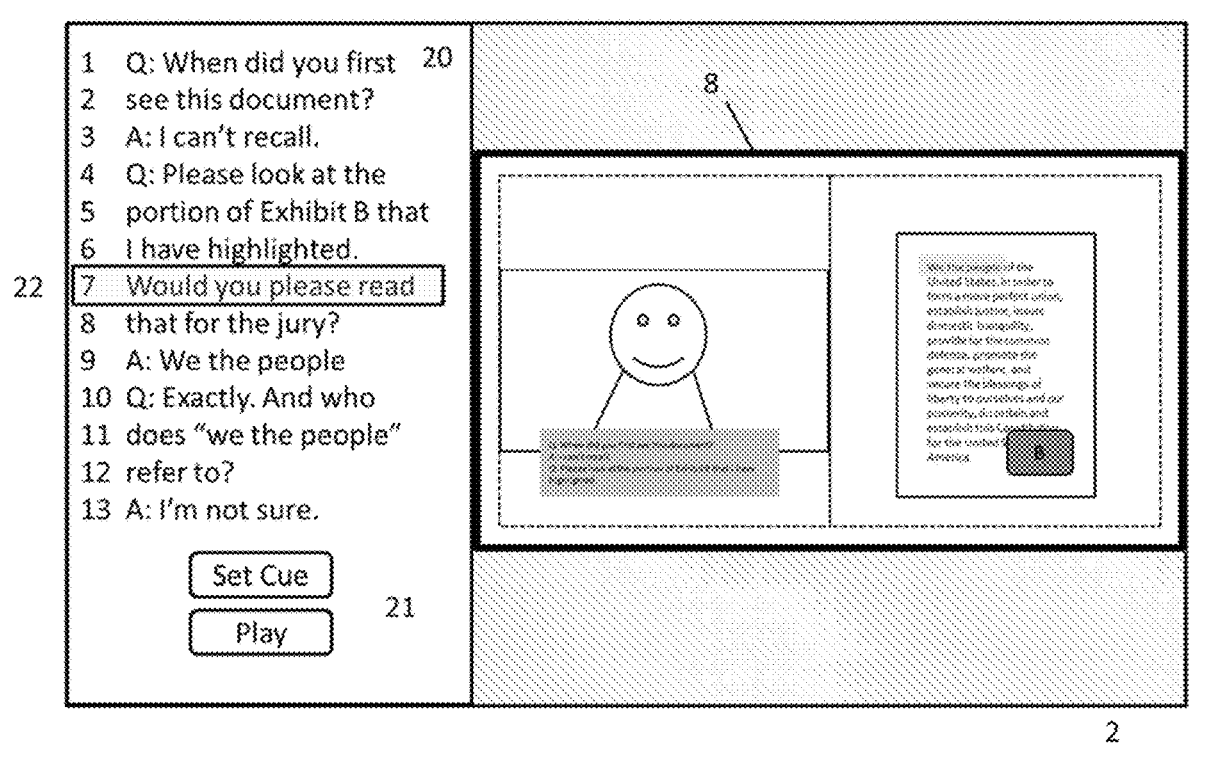

In FIG. 7, the operator display (2) is shown for the same scenario. The video has been temporarily paused in this figure so that the operator can set up a cued scene. In this figure, for clarity, the staging area (8) has been shrunk to make room for a transcript viewer (20) depicting the lines of the transcript and also containing a command area (21). However, preferably the transcript viewer (20) (a kind of operator-specific content) overlaps the staging area, yet is still invisible on the audience display (3), as discussed in the Moore patent. In this example, a line of the transcript (22) has been selected to be linked to a cued scene, which has been prepared in the staging area (8). This cue will specify that the video and transcript window will be docked left, and that a document will be displayed, docked right, with a portion highlighted. After the operator executes the "Set Cue" command, the cued scene (18) is stored in the database (23) via the aforementioned process. Specifically, in this particular embodiment, the cued scene (18) is stored as part of a data structure representing the synchronized transcript, which is also part of the database (23), and is specifically associated with the transcript line (22) at which point the cue is to be executed. Optionally, the cued scene (18) can be stored in the database (23) directly accessible to the operator outside the context of a linear video playback.

Figure 6:
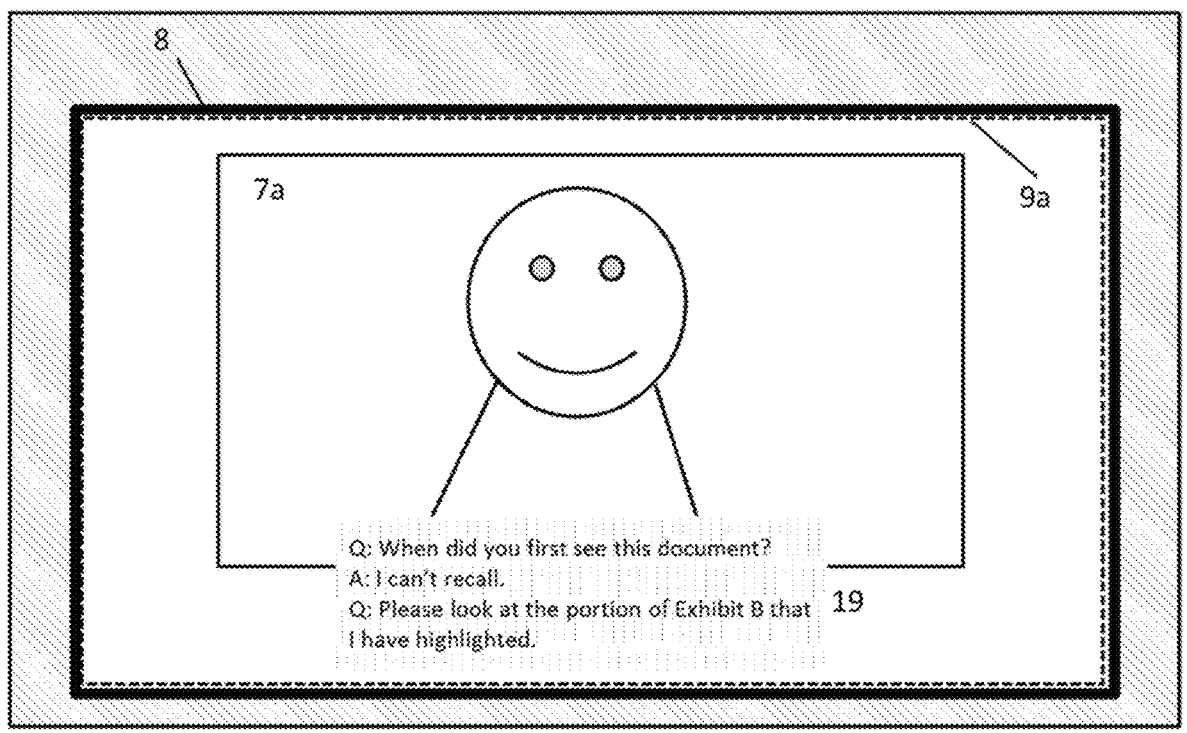
FIG. 6 depicts an audience view of video of a speaker with closed captioning in a preferred embodiment.
Figure 8:
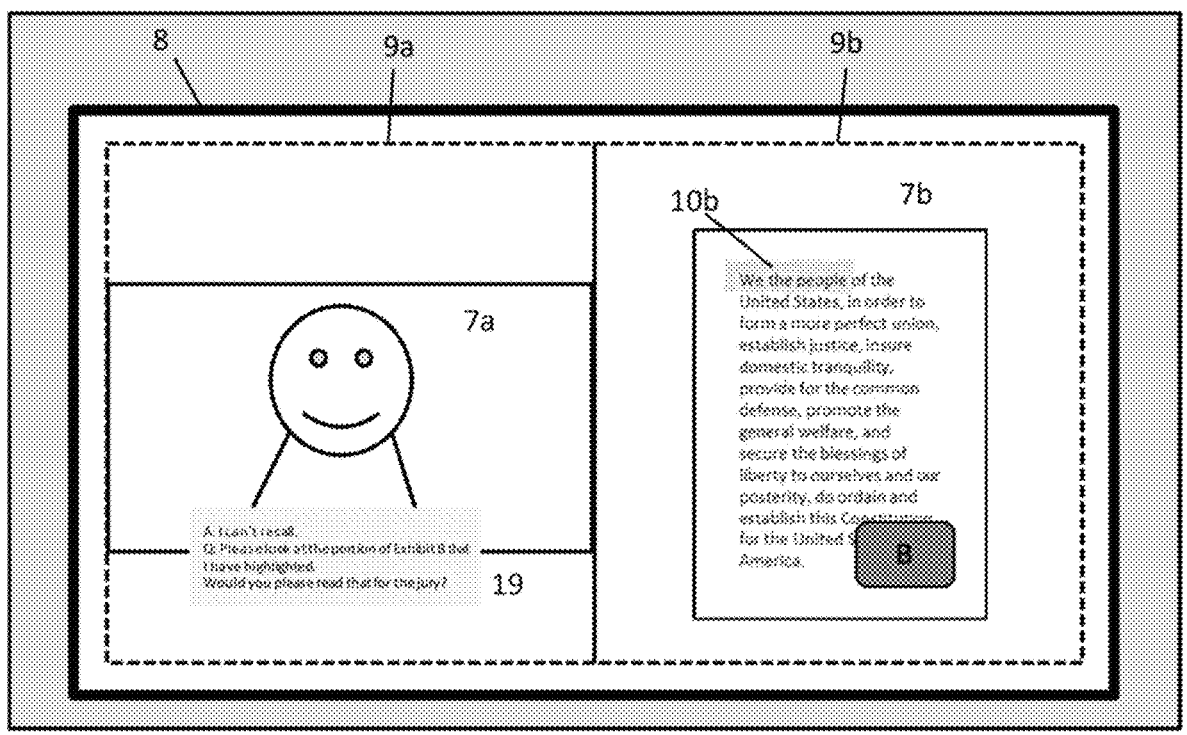
FIG. 8 depicts the audience's view of the video presentation depicted in FIG. 7.

In the example, the video depicted in FIGS. 6 and 7 is replayed from the beginning. Initially, the audience display is as depicted in FIG. 6. However, when the video position is reached corresponding to the cued transcript line (22), the cued scene (18) is recalled using the above-described process. As a result, the audience display (3) becomes as depicted in FIG. 8, automatically, without further input from the operator. Specifically, the image window (9*a*) does not reload or restart the video (7*a*) but only docks it left as required by the cue. A second image window (9*b*) is then opened, an image copy (7*b*) is created, and the annotation (10*b*) is added.

In general, cued scenes (18) associated with synchronized transcript media are expected to be executed during the playback of said media, and thus a pointer (17) to the video data (5) in the data structure (13) may be unnecessary for the video window (9*a*); the assumption is that the window is already playing that media and there is no need to re-access that data as part of restoration of the cued scene. Preferably, however, a data structure (13) associated with a video window (9*a*) does in fact contain all of the data necessary to reproduce the scene even if the video is not playing linearly. This data would include the pointer (17) to the video data (5), as well as a timecode or transcript line indicating the video and transcript position at the intended time of the cue. In this way, a cued scene associated with a video could be recalled manually, if desired, with playback position set to the cue location and playback optionally initiating automatically upon cue recall. Thus, a cued scene need not be recallable only during linear playback of the complete video from start to finish, but could be recalled if the operator desires to play only a portion of the transcript. This is common, for example, in jury trials, where a witness's deposition video can be used to "impeach" him because it is inconsistent with something said on cross-examination. The presenter does not necessarily know in advance which portions of the deposition he will wish to use to impeach the witness, and thus in practice identifies multiple different portions of the deposition for this purpose, playing only those that wind up becoming relevant at trial. The invention, as described, provides the questioning attorney this flexibility while still allowing the visual aspects of the presentation to be staged in advance and recalled automatically without requiring that complex user interactions be performed during playback.

Of course, this aspect of the invention is not limited to synchronized video depositions, but is applicable to any time-based media, including a simple video or audio recording. To that end, a cued scene (18) need not be associated with a transcript line, but could be associated simply with a time code or video frame. A cued scene (18) can also include, in addition to the data structures (13), a command to pause or hide the media playback (7). For example, a prosecutor showing the jury a security video of a crime may wish for the defendant's photo to appear in a separate image window on screen when the video reaches the point where the defendant's face can be seen, and for the video to then be paused. Alternatively, during playback of a video deposition the witness may be discussing two documents which the presenter wishes to present to the jury during playback, leaving no room for the video; in that case, the cued scene (18), rather than a command to dock the video window (9), can be set up to instruct the program to hide the video window (9), allowing two image windows (9a, 9b) to be docked side by side. When a subsequent cue indicates that the video is again to be seen, the program likewise unhides the video.

Besides playing cued time-synchronized sequences in real time, the invention can optionally render a cued presentation, specifically the contents of the staging area (8) over time, to a new video file, thereby outputting a movie playable in a simple media player. In the preferred embodiment, this is accomplished by cycling through the time-based media to which the cues correspond, such as a transcript, at a constant frame rate (such as 30 frames per second), executing any cues as they are encountered, capturing the visual "bitmap" of the staging area (8) for each frame, and outputting the bitmap to the video file. In this fashion, highly intricate presentations can be created and rendered to a video file in advance of the live presentation. This is useful for several reasons, among them, providing a client, opposing counsel, or judge a "preview" of the live presentation that will be given in court, or perhaps where a user is concerned the presentation is too intricate and resource-intensive to risk display in real time to an audience.

Another aspect of the present invention involves storing geometric information describing cued scenes (18) in a device-independent manner. Specifically, coordinates, magnification factors, and other geometric parameters like width and length can, instead of being stored and processed by reference to device-dependent pixels, be stored and processed by reference to objective measurements that are agnostic to the physical dimensions or pixel densities or even aspect ratios of the display device. This is useful because displays used in presentation rooms and court rooms typically may not match the resolution or aspect ratio of the device used to create a scene. In prior art presentation systems, such as MICROSOFT POWERPOINT, a slide-show presented in a different aspect ratio than it was designed for will be automatically "letterboxed" or "pillar-boxed" much like a video would be in a similar situation. In addition, images in such a slideshow are stored statically at a fixed resolution (or DPI), without reference to the original image data (presumably at a much higher resolution). If the display used to present the slideshow is a higher resolution than that of the image copies stored in the presentation, that additional resolution is not utilized because the original image data (presumably a much higher resolution than the image copy in the slide show) is not available. The invention improves upon these disadvantages through, in addition to the aforementioned features, the use of device-independent geometry, the specifics of which now follow.

Figure 9:
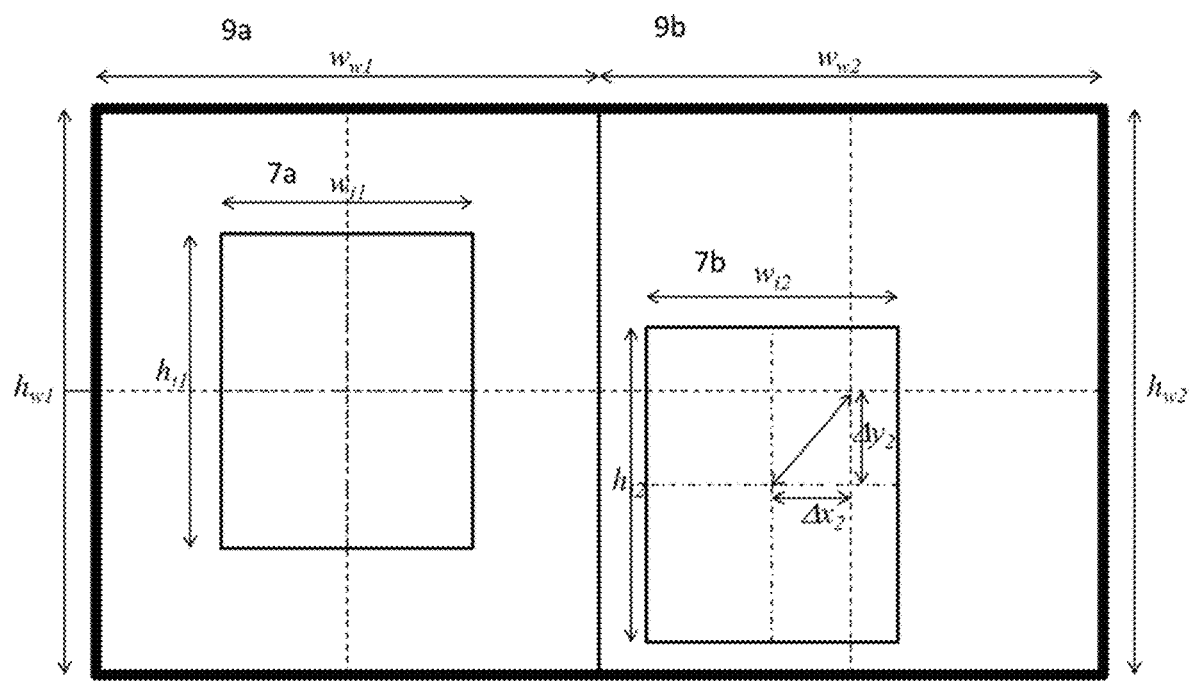
FIG. 9 depicts computing the position and magnifications of documents for later recall in a preferred embodiment.

Referring to FIG. 4 and to FIG. 9, in a preferred embodiment, the image copy (7)'s pan position (part of the basic data substructure (14)) is represented by noting the location of the image copy (7's) center relative to the center of the image window (9). (The center lines are indicated in FIG. 9 as dashed lines). Furthermore, the position coordinates (x,y values) are represented in a normalized fashion, specifically, as fractions of the image copy (7)'s displacement from the center of the image window (9) relative to the entire size of the image copy (7). For instance, referring to FIG. 9, since the image (7a) is centered in the image window (9a) its normalized coordinates are stored in the basic data substructure (14) as 0,0. However, the image (7b) has been panned; the center of the image (7b) no longer coincides with the center of the image window (9b). The displacement stored in the data substructure (14) is calculated by subtracting from the center coordinates of the image window (9b) the center coordinates of the image (7b), and dividing those resulting coordinates ($\Delta_{x2}$, $\Delta_{y2}$) by the image copy (7b)'s width and height ($w_{i2}$, $h_{i2}$), respectively. Notably, the width and height of the image (7b) being used in this case is the full width and height, respectively, of the image (7b), in the same coordinate scale as the image window (9b), and without regard to possible clipping of the image (7b) due to panning and without regard to its magnification. Of course, persons of skill in the art are capable of programming the appropriate transformations if other implementations utilize disparate coordinate systems.

Referring still to FIG. 9, and specifically the right-hand image, the image copy (7b)'s device-independent magnification is preferably stored in the basic data structure (14) as two floating point numbers, representing magnification ratios constituting the image copy (7b)'s displayed width relative to the width of the image window (9b)

$$\left(\frac{w_{i2}}{w_{w2}}\right),$$

and the image copy (7b)'s displayed height relative to the height of the image window (9b)

$$\left(\frac{h_{i2}}{h_{w2}}\right).$$

In the example shown in FIG. 9, the image copy (7b)'s width is precisely half that of the image window (9b), thus its width-based magnification factor is 0.5. If the image copy (7b) were magnified such that its width was double that of the image window (9b) (that is, exactly half its width would be visible in the image window (9b)), its width-based magnification factor would be 2.0. Again, as should be apparent, the image copy (7b)'s entire height and width, in the coordinate scale of the image window (9b), are used for these calculations, without regard to clipping caused by the magnification.

Representing the pan coordinates and magnification of the images (7) constituting the saved cued scene (18) in this fashion is advantageous for at least two reasons. First, when a presentation display resolution differs from that of the design display, the invention maintains the integrity of the intended scene because scene parameters are stored without regard to the pixel density of the display. Thus, for example, a scene created on a 768p display will not appear shrunk on a 1080p display. Furthermore, because pointers (17) to the original, high-resolution source images (5) are stored and used to execute a cued scene (18), rather than image copies (7) whose resolution may depend on the operator display (2), content displayed on a higher resolution screen than that used by the original designer is able to utilize that higher resolution.

Second, when a presentation display's aspect ratio also differs from the design display, in which case deviation from the scene designer's intent is inevitable, the device independent nature of the invention nonetheless permits the operator the flexibility to determine how the cued scene should be modified to accommodate the different display. As part of the data associated with a cued scene (18), the program preferably notes the aspect ratio (screen width divided by height) of the operator's display (2) at the time the cued scene (18) is created, and compares it to the aspect ratio of the audience display (3) at the time the cued scene is recalled. This allows the program to determine the optimal way to utilize the magnification factors in the data structure (14) in the event the aspect ratio of the audience display is different from that of the operator display when the cued scene (18) was created, i.e., whether to preserve the integrity of image widths relative to display widths, or image heights relative to display height.

Figure 10:
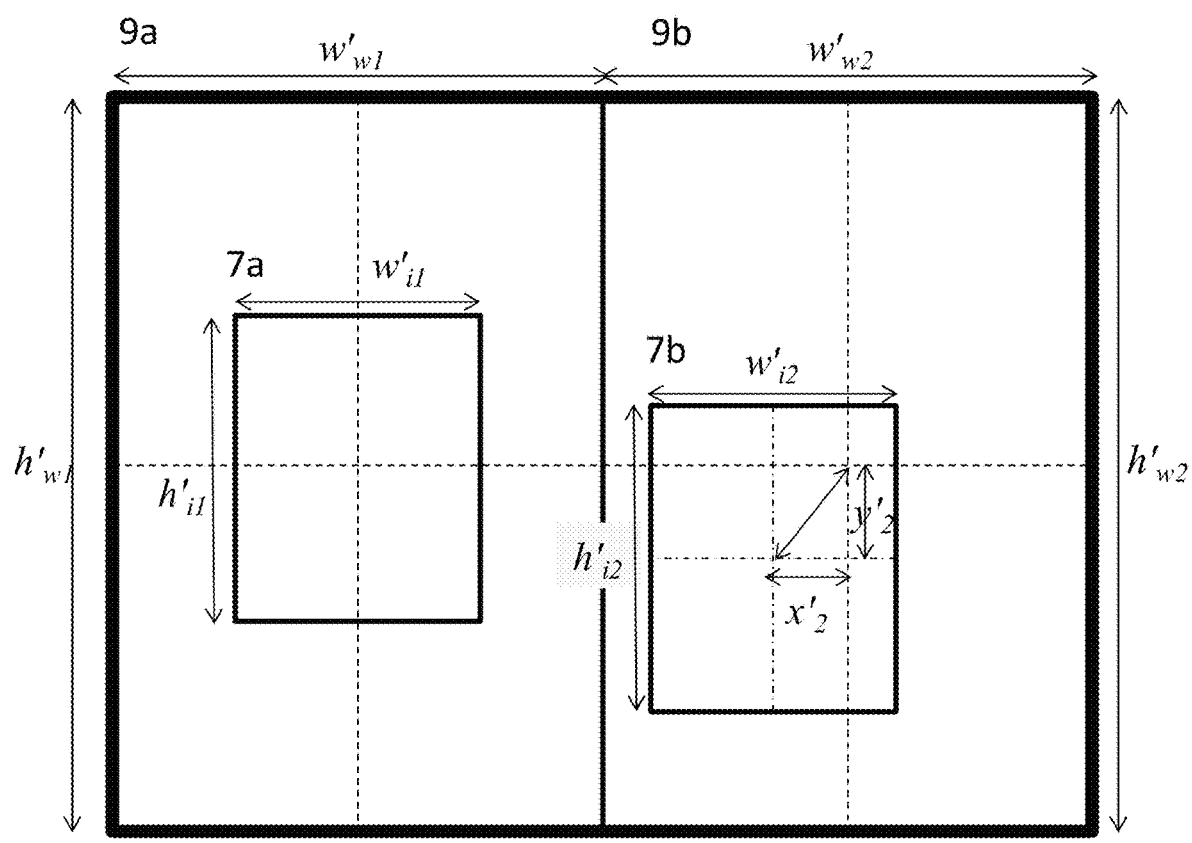
FIG. 10 depicts one method of reproducing the position and magnifications of documents when the aspect ratio of the display at the time of recall does not match the aspect ratio at the time the scene was composed.

Suppose the user prefers that when no image information be lost when moving from one aspect ratio to another. Such a preference underlies the practice of letterboxing films created in the 2.35:1 aspect ratio for display on 16:9 HDTV sets at home. That preference can be fulfilled as follows. When a cued scene (18) designed on a 16:9 display is displayed on a 4:3 display, the program preserves the integrity of image width relative to display width, basing magnification on the width-based magnification factor stored in the basic data structure (14). The result is that either white (empty) space, or possibly additional image content will be displayed above and below the portion seen by the designer at the time the cued scene (18) was created. Similarly, when a cued scene (18) designed on a 4:3 display is displayed on a 16:9 display (the display is wider), the program preserves the integrity of image height relative to display height, honoring the height-based magnification factor stored in the data structure (14), but adding whitespace or revealing additional image content in the horizontal direction. FIG. 10 depicts a saved cue designed on a 16:9 display (see FIG. 9) but displayed on a 4:3 display, under the "no clipping" scenario.

Figure 11:
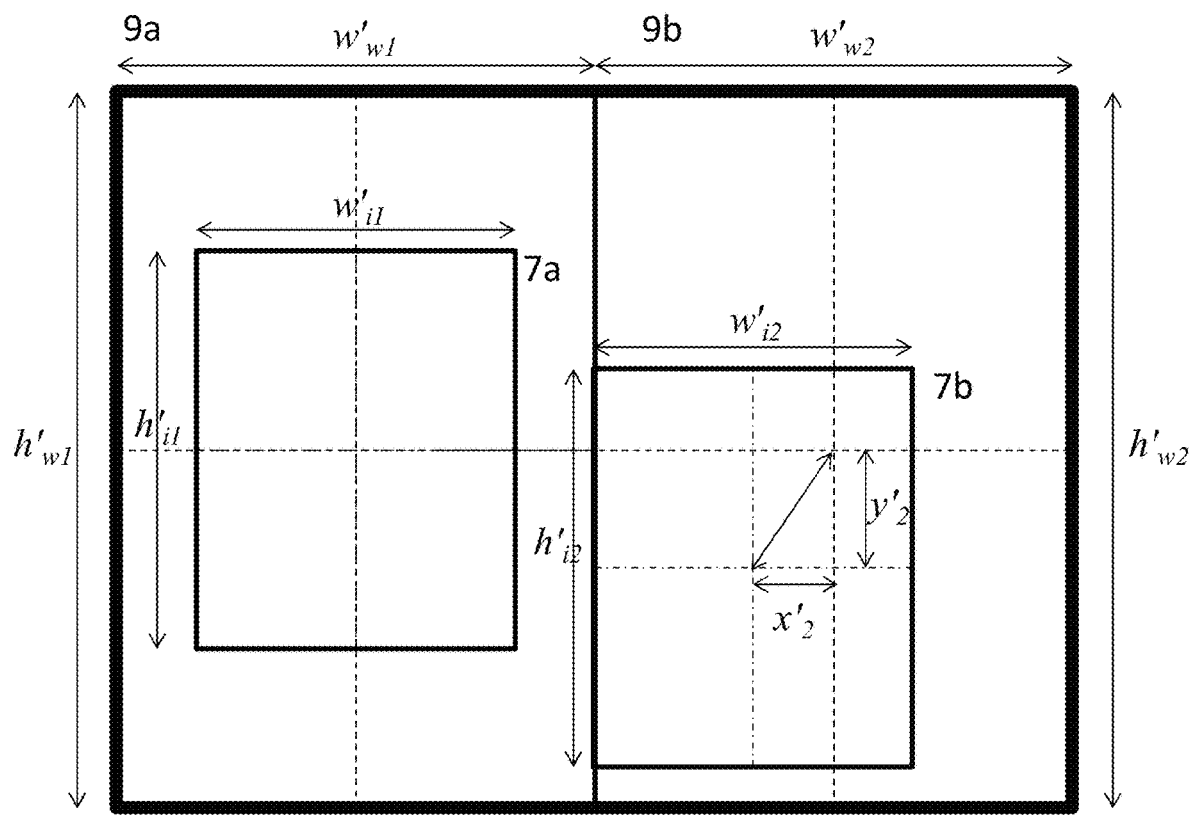
FIG. 11 depicts an alternative method of reproducing the position and magnification of documents seen in FIG. 10.

The process is, of course, inverted if the user prefers clipping of content when a cued scene is made on a display with a different aspect ratio than the audience display. Such a preference underlies the once common practice of applying "pan and scan" to a widescreen movie intended for home viewing on a 4:3 television. FIG. 11 depicts the same saved cue as FIG. 10, also recalled on a 4:3 display, but under the "pan and scan" scenario. Specifically, in this scenario, the program preserves relative widths when moving from 4:3 to 16:9 (potentially clipping content vertically), and honors heights when moving from 16:9 to 4:3 (potentially clipping content horizontally).

Herein lies an important advantage of recording image pan coordinates relative to the respective centers of the image copy and image window, discussed above, rather than the typical method of representing screen coordinates relative to the upper left corner of the screen or window. The assumption is that, like a cinematographer, a presentation designer will generally arrange a graphic scene such that the center of the image window contains the most important items to be displayed. By processing image coordinates as explained herein, the invention thus insures that regardless whether clipping or letterboxing/pillarboxing occurs, content intended by the designer to remain at the center of the display will remain so. Any portions of the images that are either clipped or expanded upon display are generally limited to the periphery.

In alternative embodiments, device-independent scene parameters may of course be represented in a multitude of other fashions, for example: the location of the upper-left corner of the image relative to the upper-left corner of the image window, stored as fractions of the image's width and height; device independent pixels standardized to a particular pixel-per-inch density; or any other method known in the art for identifying two dimensional coordinates in a device-independent manner.

It should be understood and appreciated that all examples provided herein, including the means by which certain programmatic elements are implemented in the context of a particular operating system, are entirely non-limiting to the scope of the invention.

I claim:

1. A method for presenting displayable content to an audience, comprising the steps of:
   displaying a staging area on a presentation display connected to a computer and visible to said audience,
   playing back timecoded media to said audience in a multimedia window hosted in said staging area, and
   while said timecoded media is being played back, at a predetermined timecode within said timecoded media,
   retrieving from a database connected to said computer scene information representing a visual state of said staging area, said scene information comprising a data structure for an image window to be hosted in said staging area according to said visual state, said data structure including information for retrieving from a storage source image data to be presented in said image window, information regarding a visual appearance of said image window relative to said staging area, and information regarding a visual appearance of said image data relative to said image window,
   placing within said staging area said image window for displaying said image data, positioning and sizing said image window relative to said staging area according to said information regarding said visual appearance of said image window, and
   placing within said image window a depiction of said image data, positioning and sizing said depiction relative to said image window according to said information regarding said visual appearance of said image data,
   wherein said timecoded media has been transcribed as a text transcript comprising a transcript line, wherein said transcript line has been associated with a playback time within said timecoded media, wherein said visual state has been associated with said transcript line, and wherein said predetermined timecode within said timecoded media is derived from said playback time of said transcript line.

2. The method of claim 1, further comprising the step of altering said depiction of said image data according to annotation parameters specified in said data structure.

3. The method of claim 2, wherein said annotation parameters comprise data representing visual drawings to be overlaid upon said depiction of said image data.

4. The method of claim 2, wherein said annotation parameters comprise data identifying a subset of said image data to be reproduced in said staging area as a secondary image window, and information regarding the visual appearance of said secondary image window relative to said staging area.

5. The method of claim 1, wherein said data structure includes a unique identifier, and wherein the step of placing within said staging area said image window for displaying said image data further includes the steps of:
attempting to locate within said staging area an existing image window associated with said unique identifier,
if an existing image window is located, altering the appearance of said existing image window according to said data structure without retrieving said image data from said storage source, and,
if an existing image window is not located, creating a new image window within said staging area, assigning said unique identifier to said image window, and retrieving said image data from said storage source.

6. The method of claim 1, said staging area having an original aspect ratio, said presentation display having a current aspect ratio, and said image window and said depiction of said image data each having an original width and an original height,
said data structure further comprising information regarding said original width of said depiction of said image data relative to said original width of said image window, said original height of said depiction of said image data relative to said original height of said image window, and said original aspect ratio of said staging area,
wherein the step of placing within said image window a depiction of said image data further comprises comparing said current aspect ratio of said presentation display to said original aspect ratio of said staging area,
wherein, if said current aspect ratio of said presentation display is wider than said original aspect ratio, said depiction is sized and positioned within said image window according to said original height of said depiction relative to said original height of said image window, and
wherein, if said current aspect ratio of said presentation display is narrower than said original aspect ratio, said depiction is sized and positioned within said image window according to said original width of said depiction relative to said original width of said image window.

7. The method of claim 1, wherein said data structure further includes information regarding the visual appearance of a transcript window relative to said staging area, and further comprising the steps of, while said timecoded media is being played back, at said predetermined timecode within said timecoded media,
placing within said staging area said transcript window, positioning and sizing said transcript window relative to said staging area according to said information regarding the visual appearance of said transcript window, and
displaying within said transcript window a depiction of said transcript line.

8. A non-transitory computer readable medium containing program instructions for causing a computer to perform the method of:
displaying a staging area on a presentation display connected to a computer and visible to an audience,
playing back timecoded media to said audience, and
while said timecoded media is being played back, at a predetermined timecode within said timecoded media,
retrieving from a database connected to said computer scene information representing a visual state of said staging area, said scene information comprising a data structure for an image window to be hosted in said staging area according to said visual state, said data structure including information for retrieving from a storage source image data to be presented in said image window, information regarding a visual appearance of said image window relative to said staging area, and information regarding a visual appearance of said image data relative to said image window,
placing within said staging area said image window for displaying said image data, positioning and sizing said image window relative to said staging area according to said information regarding said visual appearance of said image window, and
placing within said image window a depiction of said image data, positioning and sizing said depiction relative to said image window according to said information regarding said visual appearance of said image data,
wherein said timecoded media has been transcribed as a text transcript comprising a transcript line, wherein said transcript line has been associated with a playback timecode within said timecoded media, wherein said visual state has been associated with said transcript line, and wherein said timecode within said timecoded media is derived from said playback timecode associated with said transcript line.

9. The non-transitory computer readable medium of claim 8, wherein said data structure further includes information regarding a visual appearance of a transcript window relative to said staging area, said method further comprising the steps of, while said timecoded media is being played back, at said predetermined timecode within said timecoded media,
placing within said staging area said transcript window, positioning and sizing said transcript window relative to said staging area according to said information regarding said visual appearance of said transcript window, and
displaying within said transcript window a depiction of said transcript line.

* * * * *